(12) United States Patent
Tonomura et al.

(10) Patent No.: US 10,212,764 B2
(45) Date of Patent: Feb. 19, 2019

(54) INDUCTION HEATED ROLL APPARATUS

(71) Applicant: TOKUDEN CO., LTD., Kyoto-shi, Kyoto (JP)

(72) Inventors: Toru Tonomura, Otsu (JP); Yasuhiro Fujimoto, Kyoto (JP); Masayoshi Kimura, Otsu (JP)

(73) Assignee: TOKUDEN CO., LTD., Kyoto-Shi, Kyoto (JP)

( * ) Notice: Subject to any disclaimer, the term of this patent is extended or adjusted under 35 U.S.C. 154(b) by 5 days.

(21) Appl. No.: 14/693,786

(22) Filed: Apr. 22, 2015

(65) Prior Publication Data
US 2015/0312970 A1 Oct. 29, 2015

(30) Foreign Application Priority Data
Apr. 23, 2014 (JP) .................................. 2014-088781

(51) Int. Cl.
*H05B 6/14* (2006.01)
*D21G 1/02* (2006.01)
(Continued)

(52) U.S. Cl.
CPC .............. *H05B 6/145* (2013.01); *D21G 1/028* (2013.01); *H05B 6/06* (2013.01); *H05B 6/36* (2013.01); *Y02P 70/24* (2015.11)

(58) Field of Classification Search
CPC .......... D21G 1/028; H05B 6/06; H05B 6/145; H05B 6/36
(Continued)

(56) References Cited

U.S. PATENT DOCUMENTS 2,773,161 A * 12/1956 Baker ................ G05D 23/1906
219/155
3,686,460 A 8/1972 Lamparter et al.
(Continued)

FOREIGN PATENT DOCUMENTS

DE 2039717 A 1/1972
DE 4024432 A1 2/1992
(Continued)

OTHER PUBLICATIONS

European Patent Office, Extended European Search Report Issued in Application No. 15163804.6, dated Sep. 29, 2015, Germany, 4 pages.
(Continued)

*Primary Examiner* — Dana Ross
*Assistant Examiner* — Joe E Mills, Jr.
(74) *Attorney, Agent, or Firm* — Alleman Hall Creasman & Tuttle LLP

(57) ABSTRACT

The present invention for eliminating a need for a temperature detecting element adapted to measure the temperature of a roll main body provides an induction heated roll apparatus including: a roll main body; a magnetic flux generating mechanism including an iron core and a winding; and a power supply circuit provided with a control element adapted to control AC current or AC voltage. The apparatus calculates the temperature of the roll main body using an AC current value obtained by an AC current detecting part, an AC voltage value obtained by an AC voltage detecting part, a power factor obtained by a power factor detecting part, a winding resistance value of the winding, and an excitation resistance obtained from characteristics of a relationship between a magnetic flux density and an excitation resistance of a magnetic circuit including the iron core and the roll main body as parameters.

8 Claims, 11 Drawing Sheets

(51) Int. Cl.
*H05B 6/06* (2006.01)
*H05B 6/36* (2006.01)

(58) Field of Classification Search
USPC ....... 219/674, 660, 700, 619, 607, 664, 644,
219/663, 656, 645; 702/130; 399/333,
399/69, 12; 72/202; 492/20, 46, 7
See application file for complete search history.

(56) References Cited

U.S. PATENT DOCUMENTS

| | | | | |
|---|---|---|---|---|
| 3,772,492 A * | 11/1973 | Brogden | ............... | D02J 13/005 219/619 |
| 3,961,151 A * | 6/1976 | Danner | ............... | H01F 5/06 219/619 |
| 4,384,514 A * | 5/1983 | Larive | ............... | B21B 37/32 100/162 B |
| 4,629,867 A * | 12/1986 | Baumgartinger | ....... | B29C 33/02 165/89 |
| 4,658,716 A * | 4/1987 | Boissevain | ............... | B30B 3/04 100/162 B |
| 5,434,389 A * | 7/1995 | Griebel | ............... | G01R 31/06 219/663 |
| 5,990,464 A * | 11/1999 | Hino | ............... | B21B 1/26 219/602 |
| 6,037,576 A * | 3/2000 | Okabayashi | ....... | G03G 15/2003 219/619 |
| 6,139,181 A | 10/2000 | Olszowka | | |
| 8,457,539 B2 * | 6/2013 | Nanjo | ............... | G03G 15/2064 219/619 |
| 8,559,838 B2 * | 10/2013 | Ogawahara | .......... | G03G 15/206 399/12 |
| 8,796,602 B2 * | 8/2014 | Miyauchi | ............... | H05B 6/062 219/620 |
| 2004/0099650 A1 * | 5/2004 | Imai | ............... | G03G 15/2053 219/221 |
| 2005/0205557 A1 * | 9/2005 | Sone | ............... | H05B 6/145 219/619 |
| 2005/0255396 A1 * | 11/2005 | Kitano | ............... | F28D 15/02 219/619 |
| 2007/0045293 A1 * | 3/2007 | Ishikawa | ............... | G03G 15/2039 219/619 |
| 2007/0212091 A1 * | 9/2007 | Kinouchi | ........... | G03G 15/2053 399/69 |
| 2008/0112720 A1 * | 5/2008 | Kagawa | ............... | G03G 15/206 399/69 |
| 2009/0103958 A1 * | 4/2009 | Takai | ............... | G03G 15/2064 399/328 |
| 2010/0147834 A1 * | 6/2010 | Witte | ............... | C21D 1/10 219/650 |
| 2010/0258555 A1 * | 10/2010 | Cheung | ............... | H05B 6/02 219/660 |
| 2010/0286945 A1 * | 11/2010 | Tango | ............... | H05B 6/06 702/130 |
| 2010/0320196 A1 * | 12/2010 | Tabuchi | ............... | G03G 15/80 219/660 |
| 2011/0013918 A1 * | 1/2011 | Jeong | ............... | H05B 3/02 399/37 |
| 2012/0093551 A1 * | 4/2012 | Ogawa | ............... | G03G 15/2057 399/333 |
| 2012/0097663 A1 * | 4/2012 | Ito | ............... | C21D 1/10 219/602 |
| 2012/0305547 A1 * | 12/2012 | Fukutani | ............... | C21D 9/60 219/660 |
| 2013/0119052 A1 * | 5/2013 | Yamamoto | ............... | H05B 6/06 219/660 |
| 2013/0164013 A1 * | 6/2013 | Kondo | ............... | G03G 15/2039 399/67 |
| 2014/0361007 A1 * | 12/2014 | Halada | ............... | B29C 65/3644 219/633 |
| 2015/0237680 A1 * | 8/2015 | Ono | ............... | H05B 6/06 219/662 |
| 2016/0169751 A1 | 6/2016 | Zenzen | | |

FOREIGN PATENT DOCUMENTS

| | | |
|---|---|---|
| DE | 102010051559 B4 | 3/2015 |
| EP | 0892585 A2 | 1/1999 |
| EP | 0831385 B1 | 11/2001 |
| EP | 1215942 A1 | 6/2002 |
| EP | 2897443 B1 | 5/2016 |
| JP | H10074004 A | 3/1998 |
| JP | H10074018 A | 3/1998 |
| JP | H11097162 A | 4/1999 |
| JP | 2001023766 A | 1/2001 |
| JP | 2002083675 A | 3/2002 |
| JP | 2004116538 A | 4/2004 |
| JP | 2004195888 A | 7/2004 |
| JP | 4035146 B | 11/2007 |
| JP | 2014005409 A | 1/2014 |
| JP | 2014095498 A | 5/2014 |
| WO | 2014180750 A2 | 11/2014 |

OTHER PUBLICATIONS

Tonomura, T., "Heating techniques of sterilization and food processing in food factories," Machinery & Equipment for Food Industry, vol. 50, No. 4, Apr. 1, 2016, 10 pages. (See NPL document 6, Office Action Issued in Japanese Application No. 2014-088781 for Explanation of Relevance).

Tonomura, T., "Optimal techniques of induction heating for thermal processing of food and superheated steam generation," Food Industry, vol. 56, No. 12, Jun. 4, 2013, 11 pages. (See NPL document 6, Office Action Issued in Japanese Application No. 2014-088781 for Explanation of Relevance).

"Corporate introduction and product information of Tokuden Co., Ltd." Japan TAPPI Journal, vol. 67, Issue 8, Jul. 25, 2013, 10 pages. (See NPL document 6, Office Action Issued in Japanese Application No. 2014-088781 for Explanation of Relevance).

Tonomura, T., "Problems in installation of superheated steam generator in factory lines and a solution," Food Industry, vol. 57, Issue 4, Feb. 2, 2014, 17 pages. (See NPL document 6, Office Action Issued in Japanese Application No. 2014-088781 for Explanation of Relevance).

European Patent Office, Summons to Attend Oral Proceedings Issued in European Application No. 15163804.6, Dec. 8, 2017, 12 pages.

Japan Patent Office, Office Action Issued in Japanese Application No. 2014088781, dated Jan. 11, 2018, 6 pages. (Submitted with English Translation of Office Action).

European Patent Office, the Minutes of the Oral Proceedings Before the Opposition Division, Issued in Application No. 15163804.6, Aug. 24, 2018, Germany, 8 pages.

European Patent Office, Interlocutory Decision in Opposition Proceedings, Issued in Application No. 15163804.6, Aug. 24, 2018, Germany, 17 pages.

* cited by examiner

INDUCTION HEATED ROLL APPARATUS

TECHNICAL FIELD

The present invention relates to an induction heated roll apparatus.

BACKGROUND ART

As disclosed in Patent Literature 1, induction heated roll apparatuses include one that directly measures temperature with a temperature detecting element attached to a roll main body as a heated body.

Meanwhile, a roll main body is a rotating body, and therefore in many cases, it is not easy to attach a temperature detecting element. Also, in the case of attaching a temperature detecting element to a roll main body, a contact state between the temperature detecting element and the roll main body is individually different, which may cause an error in detected temperature. Further, in order to input an output from a temperature detecting element provided in a roll main body to a fixed control device, a sophisticated device such as a rotary transformer is required.

In addition, it is also possible to use non-contact type temperature detecting means such as a radiation pyrometer to detect the temperature of a roll main body; however, in such a case, it is often difficult to detect an accurate temperature because detection accuracy is low or the temperature is affected by a surface radiation rate (emission rate) of the roll main body.

CITATION LIST

Patent Literature

Patent Literature 1; JP-A2001-23766

SUMMARY OF INVENTION

Technical Problem

Therefore, the present invention is made in order to solve the above-described problems, and a main object thereof is to eliminate the need for a temperature detecting element adapted to measure the temperature of a roll main body in an induction heated roll apparatus.

Solution to Problem

That is, the induction heated roll apparatus according to the present invention is an induction heated roll apparatus including: a roll main body that is rotatably supported; a magnetic flux generating mechanism that is provided inside the roll main body and includes an iron core and a winding wound around the iron core; and a power supply circuit that is connected to the winding and provided with a control element adapted to control AC current or AC voltage. The induction heated roll apparatus further includes a roll temperature calculation part that calculates a temperature of the roll main body with use of, as parameters, a current value obtained by a current detecting part adapted to detect the AC current flowing through the winding, a voltage value obtained by a voltage detecting part adapted to detect the AC voltage applied to the winding, a power factor obtained by a power factor detecting part adapted to detect the power factor of an induction heated roll including the roll main body and the magnetic flux generating mechanism, a winding resistance value of the winding, and an excitation resistance value obtained from a characteristic of a relationship between magnetic flux density generated by the magnetic flux generating mechanism and excitation resistance of a magnetic circuit configured to include the iron core and the roll main body. Note that as the characteristic of the relationship between the magnetic flux density generated by the magnetic flux generating mechanism and the excitation resistance of the magnetic circuit configured to include the iron core and the roll main body, a preliminarily measured one can be used. Also, the winding resistance value of the winding may be directly detected by providing a winding resistance detecting part adapted to detect the winding resistance of the winding, or as will be described later, may be calculated from a temperature of the winding by providing a winding temperature detecting part adapted to detect the temperature of the winding. Alternatively, the winding resistance value may be calculated by intermittently applying DC voltage to the winding and detecting DC current flowing at the time of the DC voltage application.

Such an apparatus has the roll temperature calculation part that calculates the temperature of the roll main body using the value of the current flowing through the winding, the value of the voltage applied to the winding, the power factor of the induction heated roll, the resistance value of the winding, and the excitation resistance value of the magnetic circuit as parameters, and can therefore calculate the temperature of the roll main body without providing the roll main body with a temperature detecting element.

Specifically, it is desirable that the roll temperature calculation part calculates the temperature of the roll main body by using the resistance value of the roll main body and a relative permeability of the roll main body, wherein the resistance value of the roll main body is calculated using, as parameters, the AC current value obtained by the AC current detecting part, the AC voltage value obtained by the AC voltage detecting part, the power factor obtained by the power factor detecting part, the winding resistance value, and the excitation resistance value obtained from the characteristic of the relationship between the magnetic flux density and the excitation resistance of the magnetic circuit.

More specifically, the induction heated roll apparatus includes an impedance calculation part that calculates impedance of the induction heated roll (hereinafter referred to as roll impedance) with use of the current value obtained by the current detecting part, the voltage value obtained by the voltage detecting part, and the power factor obtained by the power factor detecting part. Further, the impedance calculation part calculates the resistance value of the roll main body using the roll impedance, the winding resistance value, and the excitation resistance value as parameters.

Here, an equivalent circuit of the induction heated roll including the roll main body and the magnetic flux generating mechanism is illustrated in FIG. 4. When the power supply circuit applies the AC voltage, combined resistance $r_{comb}$ including the winding resistance $r_1$, excitation resistance $r_0$, and resistance $r_2$ of the roll main body can be calculated by dividing the input AC voltage V applied to the winding by the AC current I flowing through the winding, and multiplying a resultant value by the power factor $\cos \varphi$ of the induction heated roll. The combined resistance $r_{comb}$ is given by the following expressions.

$$r_{comb} = (V/I) \times \cos \varphi \, [\Omega]$$

$$r_{comb} = (r_1 r_2 + r_1 r_0 + r_2 r_0)/(r_2 + r_0) \, [\Omega]$$

Rewriting the above into an expression for obtaining the resistance $r_2$ of the roll main body gives the following expression.

$$r_2=(r_1-r_{comb})/(r_{comb}-r_1-r_0)[\Omega]$$

In the expression for the resistance $r_2$ of the roll main body, the excitation resistance $r_0$ can be obtained from the relationship of the excitation resistance $r_0$ with the magnetic flux density generated by the magnetic flux generating mechanism. This relationship is determined by a combination of a configuration of the iron core, such as material and shape, and a material of the roll main body. FIG. 7 illustrates characteristics of the relationship between the magnetic flux density generated by the magnetic flux generating mechanism and the excitation resistance in a case where the iron core of the magnetic flux generating mechanism is formed from a grain-oriented silicon steel sheet having a thickness of 0.23 mm, and the material of the roll main body is a thermally treated carbon steel S45C material.

Given that voltage obtained by a vector calculation in which voltage drops caused by a reactance $l_1$ of the winding and the resistance $r_1$ of the winding are subtracted from the input AC voltage V is Vm, the magnetic flux density Bm can be calculated using the following expressions.

$$l_1=[1.975\times D\times N^2\times\kappa\{d+(a+\sigma)/3\}/\pi Lh]\times 10^{-9}[H]$$

Here, D is the average diameter [mm] of a current penetration part of the magnetic flux generating mechanism and the roll main body, N is the number of turns of the winding, a is the thickness [mm] of a coil, Lh is the width [mm] of the winding, and d is the distance [mm] between the winding and the roll main body.

In addition, σ is the current penetration depth [mm] of the roll main body, and given that the specific resistance of the material of the roll main body is ρ [μΩ·cm], relative permeability of the roll main body is μs, and frequency is f [Hz], σ is given by a $\sigma=\{5.03\sqrt{(\rho/\mu s\times f)}\}\times 10$ [mm].

κ is the Rogowski factor and given by $\kappa=\{1-(a+\sigma+d)/\pi Lh\}$.

$$Vm=\sqrt{\{(\cos\varphi\times V-I\times r_1)^2+(\sin\varphi\times V-2\pi f\times l_1\times I)^2\}}[V]$$

$$Bm=Vm\times 10^8/(4.44\times f\times N\times Sm)[G]$$

Here, Sm is the magnetic path cross-sectional area [cm$^2$] of the iron core.

In the above expression, the relative permeability μs exhibits change characteristics specific to each material with respect to magnetic flux density, and is therefore obtained from change characteristics preliminarily measured for each material. For example, in the case where the material of the roll main body is carbon steel S45C, the relationship between the magnetic flux density and the relative permeability is as illustrated in FIG. 5.

In the calculation stage of the above expressions, the magnetic flux density Bm is not fixed, and therefore by substituting the input AC voltage V into the expression for obtaining the magnetic flux density Bm and using the magnetic flux density Bm and the relationship in FIG. 5, the relative permeability μs is obtained to calculate the current penetration depth σ. Further, the magnetic flux density Bm is recalculated using a result of the calculation, and the current penetration depth σ is recalculated using the relative permeability μs obtained from the relationship in FIG. 5. By performing repetitive calculations in this manner, each value is converged, and consequently the fixed magnetic flux density Bm is obtained.

The excitation resistance $r_0$ is obtained from the magnetic flux density Bm and the relationship between the magnetic flux density Bm and the excitation resistance $r_0$ is illustrated in FIG. 7.

In the expression for the resistance $r_2$ of the roll main body, the resistance $r_1$ of the winding is determined by the material, length, and cross-sectional area of the wire forming the winding, and the temperature of the winding, and for example, in the case where the material of the wire is copper, can be calculated using the following expressions.

$$r_1=kL/100Sc[\Omega]$$

$$k=2.1(234.5+\theta_c)/309.5$$

Here, L is the wire length [m], Sc the wire cross-sectional area [mm$^2$], and $\theta_c$ the winding temperature [° C.].

Specifically, a value of the resistance can be calculated from the temperature of the winding detected by a temperature sensor (temperature detecting part) embedded in the winding. Also, as will be described later, the resistance value of the winding can also be directly measured by applying DC voltage to the winding for a short period of time and detecting DC current flowing at the time of the DC voltage application.

Also, it is desirable that the induction heated roll apparatus includes: a DC voltage application part that controls a DC power supply to intermittently apply DC voltage to the winding; and a resistance value calculation part that calculates the winding resistance value from the DC voltage applied by the DC voltage application part and DC current flowing through the winding when applying the DC voltage, wherein the roll temperature calculation part calculates the temperature of the roll main body with use of the winding resistance value obtained by the resistance value calculation part. Specifically, it is desirable that the roll temperature calculation part calculates the temperature of the roll main body using the roll impedance obtained by the impedance calculation part, the winding resistance value obtained by the resistance value calculation part, and the excitation resistance value of the magnetic circuit.

When the temperature of the winding as a primary coil is changed by a current application, $r_1$ in the equivalent circuit of the single phase induction heated roll (single phase roll) illustrated in FIG. 4 is changed, and therefore circuit impedance is also changed, i.e., $r_{comb}$ is also changed. Accordingly, recalculating the resistance $r_2$ of the roll main body is required. However, such a change is independent of a change in temperature of a heat generating part of the roll main body, and therefore should be corrected.

The resistivity and temperature of the winding have a relationship approximately proportional to absolute temperature, and exhibit change characteristics specific to the material of the winding. For example, in the case where the wire material is copper, the relationship is given by the following expressions, and therefore by knowing the winding temperature, the resistance value $r_1$ of the winding can be calculated.

$$r_1=kL/100S[\Omega]$$

$$k=2.1(234.5+\theta_c)/309.5$$

Here, L is the wire length [m], S is the wire cross-sectional area [mm$^2$], and $\theta_c$ is the winding temperature [° C.].

Here, $r_2$ is a primary side conversion value as viewed from the winding side. Given that an inside diameter of the roll main body is Φ [cm], a current penetration depth is σ [cm], an inner surface part cross-sectional area of the current penetration depth is $S_i$ [cm²], and a calorific inner surface length (equal to the winding width) of the roll main body is $l_S$ [cm], converting $r_2$ to a secondary side conversion value $R_2$ having a unit of μΩ as viewed from the roll main body side gives the following expressions.

$$R_2 = (r_2/N^2) \times 10^6 [\mu\Omega]$$

$$R_2 = \rho\pi(\Phi+\sigma)/S_i$$

$$S_i = \sigma l_S$$

Accordingly, $$R_2 \sigma l_S = \rho\pi(\Phi+\sigma).$$

Here, given that the current penetration depth is σ, the relative permeability is μs, and the frequency is f, the following expression holds.

$$\sigma = 5.03\sqrt{(\rho/\mu s \times f)} \text{ [cm]}$$

Substituting σ into the above-described expression yields $$5.03\sqrt{(\rho/\mu s \times f)} R_2 l_S = \rho\pi\Phi + 5.03\rho\pi\sqrt{(\rho/\mu s \times f)}.$$

Dividing both sides by $5.03\sqrt{(\rho/\mu s \times f)}$ yields $$R_2 l_S = \rho\pi\Phi/\{5.03\sqrt{(\rho/\mu s \times f)}\} + \rho\pi.$$

Rearranging this expression gives $$R_2 l_S - \rho\pi = \rho\pi\Phi/\{5.03\sqrt{(\rho/\mu s \times f)}\}.$$

Squaring both sides yields $$(R_2 l_S)^2 - 2R_2 l_S \pi\rho + (\rho\pi)^2 = (\rho\pi\Phi)^2/(5.03^2 \rho/\mu s \times f).$$

Rearranging this expression gives $$(5.03 R_2 l_S)^2 - 2 \times 5.03^2 R_2 l_S \pi\rho + (5.03\pi\rho)^2 = \rho\mu s \times f(\pi\Phi)^2.$$

Further rearranging this expression gives $$(5.03\pi)^2 \times \rho^2 - \{2 \times 5.03^2 \pi R_2 l_S + (\pi\Phi)^2 \mu s \times f\}\rho + (5.03 R_2 l_S)^2 = 0.$$

Solving this equation for ρ results in $$\rho = \left(\{2 \times 5.03^2 \pi R_2 l_S + (\pi\Phi)^2 \mu s \times f\} - \sqrt{[\{2 \times 5.03^2 \pi R_2 l_S + (\pi\Phi)^2 \mu s \times f\}^2 - 4 \times 5.03^4 (\pi R_2 l_S)^2]}\right) / \{2 \times (5.03\pi)^2\}$$

Specific resistance ρ exhibits characteristics specific to each material with respect to temperature, and for example, in the case of the specific resistance ρ of carbon steel S45C, given that an inner surface temperature of the roll main body is θS[° C.], the following expression holds.

$$\rho = 14.3 \times (1 + 2.0 \times 10^{-3} \times \theta_S) \text{ [μΩ·cm]}$$

Rearranging this expression gives $$\rho = 14.3 + 2.86 \times 10^{-2} \times \theta_S.$$

Eliminating ρ yields $$14.3 + 2.86 \times 10^{-2} \times \theta_S = \left(\{2 \times 5.03^2 \pi R_2 l_S + (\pi\Phi)^2 \mu s \times f\} - \sqrt{[\{2 \times 5.03^2 \pi R_2 l_S + (\pi\Phi)^2 \mu s \times f\}^2 - 4 \times 5.03^4 (\pi R_2 l_S)^2]}\right) / \{2 \times (5.03\pi)^2\}$$

Rewriting to an expression for obtaining $\theta_S$ results in $$\theta_S = \left|\left(\{2 \times 5.03^2 \pi R_2 l_S + (\pi\Phi)^2 \mu s \times f\} - \sqrt{[\{2 \times 5.03^2 \pi R_2 l_S + (\pi\Phi)^2 \mu s \times f\}^2 - 4 \times 5.03^4 (\pi R_2 l_S)^2]}\right) / \{2 \times (5.03\pi)^2\} - 14.3\right| / (2.86 \times 10^{-2}) [°C].$$

As described above, the relative permeability μs exhibits change characteristics specific to each material with respect to magnetic flux density, and in the case where the material of the roll main body is carbon steel S45C, the relationship between the magnetic flux density and the relative permeability is as illustrated in FIG. 5.

Between the inner surface temperature $\theta_S$ of the roll main body and the surface temperature of the roll main body in a steady state, there is a predetermined relationship.

Therefore, given that a temperature difference between the inner surface temperature $\theta_S$ and a surface temperature of the roll main body is θ[° C.], it is desirable that the roll temperature calculation part corrects the temperature of the roll main body using the temperature difference θ obtained from the following expression.

$$\theta = kP/[2\pi/\{\ln(d_2/d_1)/\lambda\}]$$

Here, $d_1$ is an inside diameter [m] of the roll main body, $d_2$ is an outside diameter [m] of the roll main body, λ is a thermal conductivity [W/m·° C.] of the roll main body at average temperature, and P is a thermal flow rate [W/m], which has here a value obtained by dividing a calorific value [W] of the inner surface of the roll main body by a calorific inner surface length [m] (equal to the winding width). Also, k is a correction factor calculated from actual measured values.

Note that the thermal conductivity λ changes depending on a material or temperature of the roll main body, and FIG. 6 illustrates temperature-dependent thermal conductivity characteristics of, for example, carbon steel S45C. Also, the current penetration depth of the roll main body is several μm at high frequencies of several tens to several hundred kHz, whereas at medium frequencies of 50 to 1000 Hz, a current penetration depth of several mm to several tens of mm is obtained. For example, in the case of carbon steel, the current penetration depth is approximately 10 mm at 60 Hz and 500° C. That is, in the case of medium frequency induction heating, the current penetration depth is deep, and therefore the difference between the temperature of the heat generating part (inner surface temperature) and the surface temperature is small as compared with that at high frequencies.

Desirably, inside a lateral circumferential wall of the roll main body, jacket chambers in which a gas-liquid two-phase heating medium is included are formed. The jacket chambers are adapted to make uniform the temperature of the roll main body on the basis of heat transport through the included gas-liquid two-phase heating medium, and simultaneously uniform the surface temperature of the roll main body.

That is, detecting the temperature of the roll main body using the impedance and the power factor is equivalent to detecting the average temperature of the inner surface. Accordingly, it can be said that surface temperatures of respective parts of the roll main body, which are made uniform by the jacket chambers, are equivalent to a value obtained by making necessary corrections to the temperature detected using the impedance and the power factor to thereby convert the temperature to the surface temperature.

Here, given that the cross-sectional area of the roll main body is S, a sum of cross-sectional areas of the jacket chambers is $S_j$, and a thickness of the roll main body is t, it is desirable that the roll temperature calculation part calculates the temperature of the roll main body with use of a temperature difference θ obtained on the assumption that the inside diameter $d_1$ of the roll main body is substituted by $d_{j1}=d_1+t\{1-\alpha(1-S_j/S)\}$, and the outside diameter $d_2$ of the roll main body is substituted by $d_{j2}=d_2-t\{1-\alpha(1-S_j/S)\}$. Note that $d_{j1}$ is a virtual inside diameter taking into account a reduction in thickness due to the jacket chambers, and $d_{j2}$ is a virtual outside diameter taking into account the reduction in thickness due to the jacket chambers.

Here, given that the cross-sectional area of the roll main body orthogonal to a rotational axis of the roll main body is S, the sum of cross-sectional areas of the jacket chambers orthogonal to the rotational axis is $S_j$, and the thickness of the roll main body is t, a thermally converted thickness $t_j$ is given by the following expression.

$$t_j=\alpha \times t(S-S_j)/S, (\alpha>1)$$

Here, α is a variable indicating a ratio of a reduction in function of the jacket chambers, which is caused by a reduction in pressure of the heating medium along with a reduction in temperature. Characteristics of the α–θ relationship are determined by the type of the heating medium and the impurity concentration in the jacket chambers.

The difference between the thickness t and the thermally converted thickness $t_j$ is given by $$\begin{aligned}t-t_j &= t - \alpha \times t(S-S_j)/S \\ &= t\{1-\alpha(S-S_j)/S\} \\ &= t\{1-\alpha(1-S_j/S)\}.\end{aligned}$$

Accordingly, the thermally converted virtual inside diameter $d_{j1}$ and virtual outside diameter $d_{j2}$ of the roll main body are given by the following expressions.

$$d_{j1}=d_1+t\{1-\alpha(1-S_j/S)\}$$

$$d_{j2}=d_2-t\{1-\alpha(1-S_j/S)\}$$

That is, the ratio between the calculated outside and inside diameters is smaller, and therefore the temperature difference θ is also smaller. Accordingly, a temperature measurement error is also smaller.

In the case where the control element is a semiconductor element, a conduction angle changes waveforms of voltage and current; however, the waveforms are respectively changed into different shapes. As a result, sharing voltage across each impedance is changed to change voltage across the excitation impedance, and thereby the magnetic flux density is changed to change the excitation impedance and the relative permeability as well. Therefore, in the case where the control element, conduction angle, and load are fixed, voltage and current respectively have certain shapes, and consequently a correction factor based on the conduction angle is determined.

Desirably, the induction heated roll apparatus further includes an impedance correction part that uses the conduction angle of the control element to correct the impedance obtained by the impedance calculation part. In addition, it is also desirable that the roll temperature calculation part calculates the temperature of the roll main body with use of corrected impedance resulting from the correction by the impedance correction part.

In the case of the examined roll main body (inside diameter Φ×surface length L) with a thyristor as the control element, a change in harmonic component due to waveform distortion changes voltages across the reactance components $l_1$ and $l_2$ in the equivalent circuit. Accordingly, the voltage applied to the excitation impedance changes to change the magnetic flux density. That is, the change in magnetic flux density changes the excitation impedance and the relative permeability, and therefore the effect of the change should be corrected.

Corrected impedance $R_2$ in which the effect of a change in phase angle of the thyristor is corrected is given by $$R_2=a \times R_x.$$

Given that $C=V/V_{in}$, $$a=a_nC^n+a_{n-1}C^{n-1}+a_{n-2}C^{n-2}+, \ldots ,+a_2C^2+a_1C^1+a_0.$$

Here, $a_n$ is a factor that is determined for each induction heated roll apparatus and based on actual measured values, and $a_0$ is a constant.

Also, $R_x$ is the impedance before the correction, $V_{in}$ the receiving voltage of the thyristor, and V the output voltage of the thyristor.

The winding resistance value can be calculated by applying a constant DC voltage to the winding within a short period of time of several seconds and dividing the DC voltage by DC current flowing through the winding. Note that the DC voltage does not produce any inductive effect, and therefore the DC current is not affected by the roll main body or the iron core and has a relationship only with the winding resistance value. In addition, the winding temperature does not suddenly change, and consequently even in the case of employing values periodically measured within a short period of time, a large measurement error does not occur.

Also, intermittently applying the DC voltage refers to applying the DC voltage for an application time of several seconds or less with a regular period of, for example, several seconds to several tens of minutes. Such intermittent application can reduce a biased magnetization effect produced by a DC component, and also minimally suppress an effect on the AC circuit for induction heating. Further, a winding of an induction heated roll apparatus generally has a large thermal inertia, and a change in temperature of the winding does not take on a large value during operation under a normal constant load condition. Accordingly, it can be said that performing the temperature detection, which is performed for the short application time of several seconds or less, with the period of several seconds to several tens of minutes, preferably with a period of several tens of seconds to several minutes is sufficient for temperature control of the roll main body.

Desirably, the induction heated roll apparatus further includes a power supply circuit that is connected to the winding and provided with a control circuit part adapted to control AC current or AC voltage, and in a state where the control circuit part interrupts or minimizes the AC current or the AC voltage, the resistance value calculation part calculates the winding resistance value with the DC voltage being applied to the winding.

To detect only a DC component (DC current) from current in which AC current and DC current are superimposed as a result of applying DC voltage to the winding applied with AC voltage, a complicated detection circuit is required. Note that a typical induction heated roll apparatus includes a power supply circuit having a control circuit part adapted to control AC current or AC voltage for controlling the temperature of a roll main body. For this reason, by using the control circuit part to interrupt or reduce the AC current or the AC voltage to a minimum value only for the application time for applying the DC voltage, the effect of the AC current (AC component) can be suppressed to easily detect DC current (DC component). Note that the AC current or the AC voltage is interrupted or reduced to the minimum value within the short period of time of several seconds at time intervals of several seconds to several tens of minutes, which does not block an induction heating action.

A possible embodiment adapted to interrupt or reduce the AC current or the AC voltage to the minimum value is one adapted to, in the case where the control circuit part has a switching device such as an electromagnetic contactor, interrupt the switching device, or in the case where the control circuit part has a semiconductor element (power control element) such as a thyristor, minimize a conduction phase angle of the semiconductor element.

To accurately calculate the surface temperature of the roll main body during a temperature rise transient period or temperature fall transient period of the roll main body, it is desirable that the roll temperature calculation part calculate an inner surface temperature of the roll main body in addition to calculating a surface temperature calculation value of the roll main body in a steady state from the inner surface temperature, and calculate a surface temperature of the roll main body during the transient period on the premise that the surface temperature of the roll main body reaches the surface temperature calculation value after a time period $\Delta T$.

Here, $\Delta T$ has a value given by the following expression.

$$\Delta T = k \times w \times c \times t^2 / (2\lambda) [h],$$

where w is the specific gravity [kg/m$^3$] of the material of the roll main body, c is the specific heat [kcal/kg·° C.] of the material of the roll main body, t is the thickness [m] of the roll main body, $\lambda$ is the thermal conductivity [kcal/m·h·° C.] of the material of the roll main body, and k is a correction factor obtained from measured values.

FIG. 8 illustrates a temperature change of the roll main body during the temperature rise transient period, and FIG. 9 illustrates a temperature change of the roll main body during the temperature fall transient period. In FIGS. 8 and 9, a solid line represents the inner surface temperature of the roll main body, a dashed line represents the surface temperature calculation value at the time of reaching the steady state, which is calculated from the inner surface temperature, and an alternate long and short dashed line represents the surface temperature during the transient period.

The surface temperature during the transient period is lower than the surface temperature at the time when the steady state is reached. During the temperature rise period, after a time period $\Delta T$ (at ($T_n+\Delta T$)), the surface temperature will reach the surface temperature calculation value in the steady state calculated at time $T_n$, whereas during the temperature fall period, before the time period $\Delta T$ (at ($T_n-\Delta T$)), the surface temperature was equal to the surface temperature calculation value in the steady state calculated at time $T_n$.

Accordingly, the surface temperature should be calculated with the temperature rise and fall periods being discriminated from each other, and by comparing inner surface temperature $\theta_{i(n)}$ at time $T_n$ with inner surface temperature $\theta_{i(n-1)}$ at time $T_{(n-1)}$, i.e., at time before $\Delta T$, whether or not the time $T_n$ is during the temperature rise transient period or the temperature fall transient period is determined. That is, in the case of $\theta_{i(n)} > \theta_{i(n-1)}$, $T_n$ is during the temperature rise transient period, whereas in the case of $\theta_{i(n)} < \theta_{i(n-1)}$, $T_n$ is during the temperature fall transient period.

A time period to be compared is determined as a value which is not problematic for control, depending on the thickness or heating capacity of the roll main body, and takes a value from several milliseconds to several tens of seconds, desirably from several hundred milliseconds to several seconds.

Given that the surface temperature that is calculated from the inner surface temperature $\theta_{i(n)}$ at the time $T_n$ in the case of $\theta_{i(n)} > \theta_{i(n-1)}$, i.e., during the temperature rise transient period and at the time of reaching the steady state at the time $T_n$ is $\theta_n$, the actual surface temperature during the temperature rise transient period will reach the temperature $\theta_n$ at time $T_{(n+1)}$, i.e., at time a time period $\Delta T$ after $T_n$.

Since $T_{(n+1)}-T_n=\Delta T$, displaying the temperature $\theta_n$ at the time after the time period $\Delta T$ is equivalent to displaying the surface temperature at the time.

Given that surface temperature that is calculated from the inner surface temperature $\theta_{i(n)}$ at the time $T_n$ in the case of $\theta_{i(n)} < \theta_{i(n-1)}$, i.e., during the temperature fall transient period and at the time of reaching the steady state at the time $T_n$ is $\theta_n$, the actual surface temperature during the temperature fall transient period reached the temperature $\theta_n$ at time $T_{(n-1)}$ i.e., at time a time period $\Delta T$ before $T_n$. That is, the surface temperature is lower than $\theta_n$ at the time $T_n$, and calculating an accurate temperature is difficult. Accordingly, a temperature taking into account a temperature reduction of $\theta_{i(n-1)}-\theta_{i(n)}$ as an estimated value does not significantly deviate from the accurate temperature. That is, the surface temperature $\theta_E$ is given by the following expression.

$$\theta_E \approx \theta_n - \{\theta_{i(n-1)} - \theta_{in}\}$$

The surface temperature during the transient period will converge to the steady state calculation temperature when the induction heated roll apparatus achieves steady operation. It is unlikely that the induction heated roll apparatus is operated to produce products while the temperature of the roll main body is rising/falling, and therefore it is sufficient if the surface temperature of the roll main body can be captured as an estimated value.

Advantageous Effects of Invention

According to the present invention configured as described, without providing the roll main body with a temperature detecting element, the temperature of the roll main body can be calculated.

DESCRIPTION OF EMBODIMENTS

In the following paragraphs, one embodiment of an induction heated roll apparatus according to the present invention is described with reference to the drawings.

Figure 1:
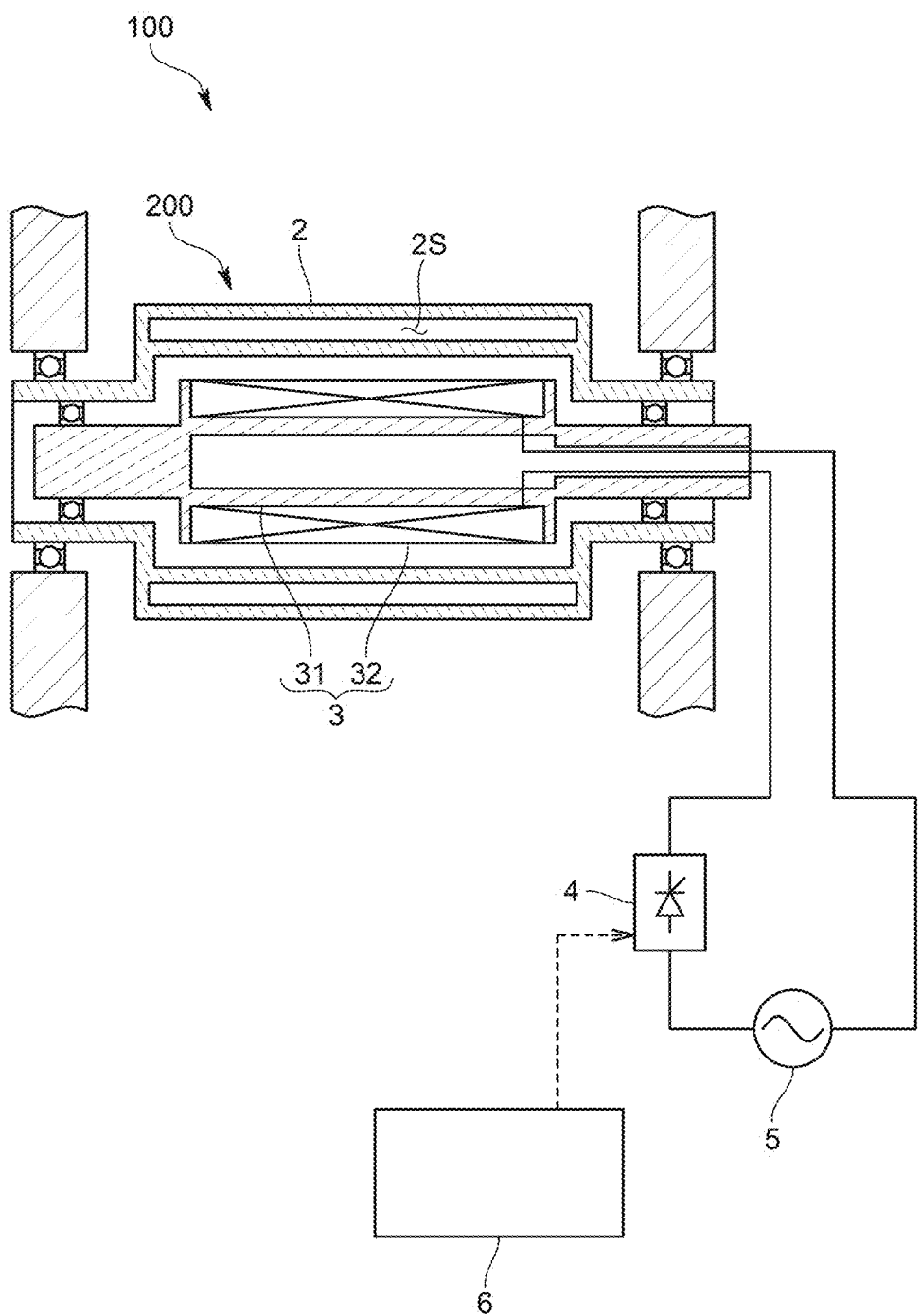
FIG. 1 is a diagram schematically illustrating a configuration of an induction heated roll apparatus according to the present embodiment.

As illustrated in FIG. 1, an induction heated roll apparatus 100 according to the present embodiment includes: a roll main body 2 that is rotatably supported; a magnetic flux generating mechanism 3 that is provided inside the roll main body 2 and includes an iron core 31 and a winding 32 wound around the iron core 31; and a power supply circuit 5 that is connected to the winding 32 and provided with a control element 4 adapted to control AC current or AC voltage.

Inside the lateral circumferential walls of the roll main body 2, multiple jacket chambers 2S in which a gas-liquid two-phase heating medium is included are formed in a circumferential direction at regular intervals. Also, the control element 4 in the present embodiment uses a semiconductor to control the conduction angle of the AC current or the AC voltage, and specifically, is a thyristor.

Further, a control device 6 adapted to control the induction heated roll apparatus 100 of the present embodiment has a surface temperature calculating function that calculates the temperature of the roll main body 2 using a value of the AC current flowing through the winding 32, a value of the AC voltage applied to the winding 32, a power factor of an induction heated roll 200 including the roll main body 2 and the magnetic flux generating mechanism 3, a winding resistance value of the winding 32, and an excitation resistance value of a magnetic circuit configured to include the iron core 31 and the roll main body 2 as parameters.

Figure 2:
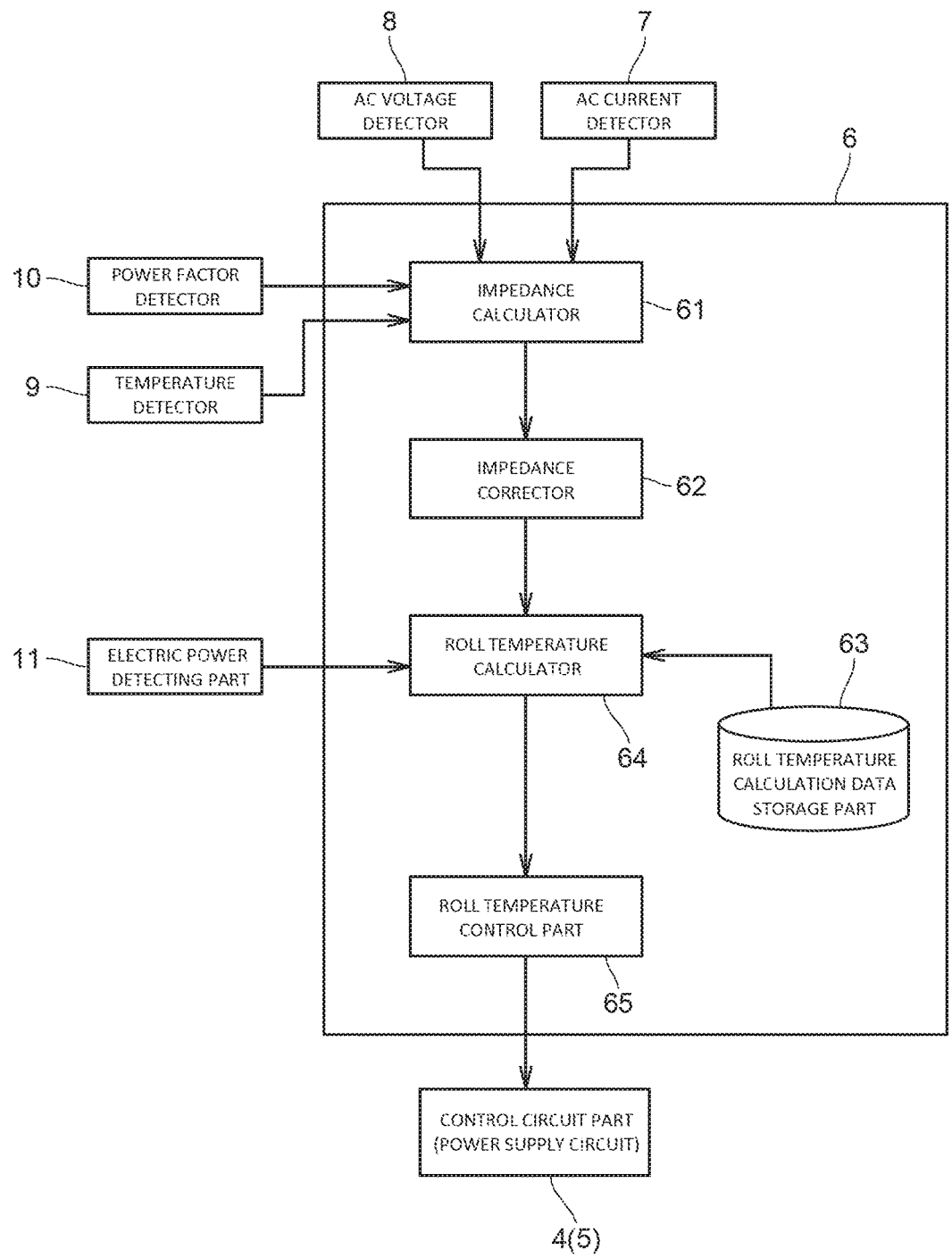
FIG. 2 is a functional configuration diagram of a control device in the same embodiment.

Specifically, the control device 6 is a dedicated or general-purpose computer including a CPU, an internal memory, an A/D converter, a D/A converter, an input/output interface, and the like. Also, the CPU and peripheral devices operate according to a predetermined program stored in the internal memory, and thereby as illustrated in FIG. 2, the control device 6 fulfills functions as an impedance calculation part 61, an impedance correction part 62, a roll temperature calculation data storage part 63, a roll temperature calculation part 64, a roll temperature control part 65, and the like.

In the following, the respective parts are described with reference to a temperature calculation flowchart in FIG. 3 together with FIG. 2.

Figure 3:
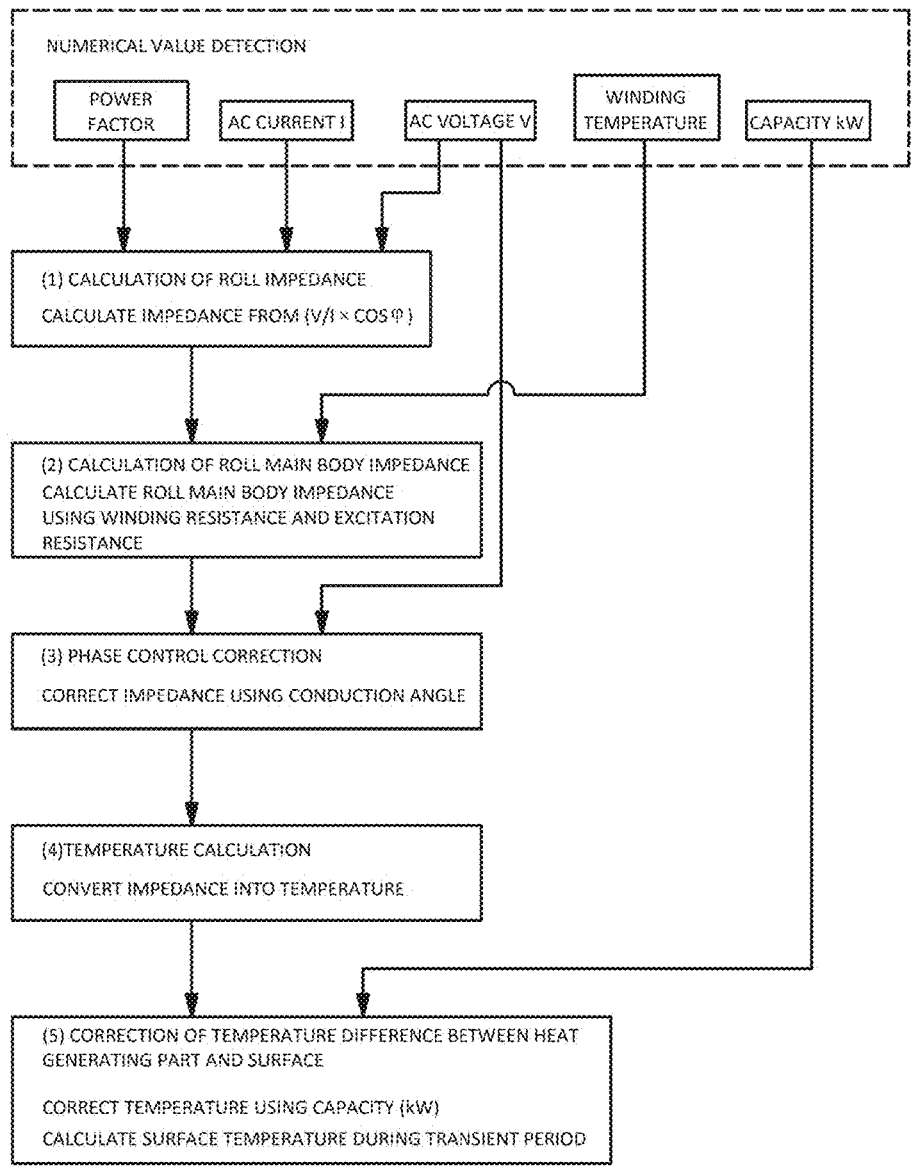
FIG. 3 is a diagram illustrating a temperature calculation flow in the same embodiment.
Figure 4:
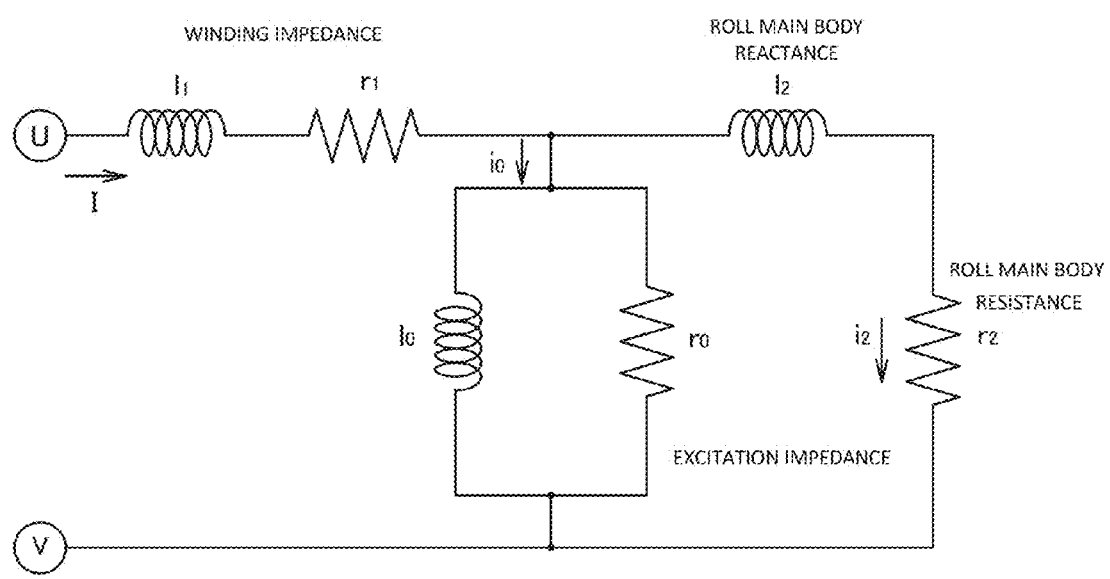
FIG. 4 is a diagram illustrating an equivalent circuit of a single phase induction heated roll (single phase roll)

The impedance calculation part 61 calculates the impedance (roll impedance) $Z_1$ ($=V \times \cos \varphi / I = r_{comb}$) of the induction heated roll 200 from the AC current value obtained by an AC current detecting part 7 adapted to detect the AC current I flowing through the winding 32, the AC voltage value obtained by an AC voltage detecting part 8 adapted to detect the AC voltage V applied to the winding 32, and the power factor obtained by a power factor detecting part 10 ((1) in FIG. 3).

Further, the impedance calculation part 61 calculates the resistance of the roll main body (roll main body resistance) $r_2$ from the impedance $r_{comb}$, the winding resistance $r_1$ obtained from winding temperature $\theta_c[° C.]$ obtained by a temperature detecting part 9 adapted to detect the temperature of the winding 32, and the excitation resistance $r_0$ obtained from characteristics of the preliminarily measured relationship between magnetic flux density and magnetic resistance of the magnetic circuit (see FIG. 7) ((2) in FIG. 3). In addition, the temperature detecting part 9 is embedded in the winding 32.

Specifically, the impedance calculation part 61 calculates the winding resistance $r_1$ using the following expressions, and then calculates the resistance $r_2$ of the roll main body.

$$r_1 = kL/100S[\Omega]$$

$$k = 2.1(234.5 + \theta_c)/309.5$$

Here, L is the wire length [m], S is the wire cross-sectional area [mm$^2$], and $\theta_c$ is the winding temperature [° C.].

Also, the impedance calculation part 61 converts the resistance $r_2$ of the roll main body to a secondary side conversion value as viewed from the roll main body side. Given that the secondary side conversion resistance of the roll main body having a unit of $\mu\Omega$ is $R_2$, and the number of turns of the winding is N, the relationship among them is given by the following expression.

$$R_2 = (r_2/N^2) \times 10^6$$

The impedance correction part 62 corrects the secondary side conversion resistance $R_2$ of the roll main body using the conduction angle (phase angle of the control element (thyristor) 4 ((3) in FIG. 3).

Specifically, the impedance correction part 62 corrects the impedance $R_2$ using the following expression.

$$R_2 = a \times R_x$$

Given that $C = V/V_{in}$, $$a = a_n C^n + a_{n-1} C^{n-1} + a_{n-2} C^{n-2} + \ldots + a_2 C^2 + a_1 C + a_0.$$

Here, $a_n$ is a factor that is determined for each induction heated roll apparatus and based on measured values, and $a_0$ is a constant.

Also, $R_X$ is the impedance before the correction, $V_{in}$ is the receiving voltage of the thyristor, and V is the output voltage of the thyristor.

The roll temperature calculation data storage part 63 stores pieces of roll temperature calculation data necessary to calculate the temperature of a heat generating part (inner surface temperature) of the roll main body 2. Specifically, the pieces of roll temperature calculation data include (a) magnetic flux density-excitation resistance relationship data indicating the relationship between the magnetic flux density and the excitation resistance of the magnetic circuit in the induction heated roll (see FIG. 7), (b) magnetic flux density-relative permeability relationship data indicating the relationship between magnetic flux density and relative permeability measured for each material (see FIG. 5), and other data.

The roll temperature calculation part 64 calculates the inner surface temperature of the roll main body 2 using the corrected impedance resulting from the correction by the impedance correction part 62 and the pieces of roll temperature calculation data stored in the roll temperature calculation data storage part 63 ((4) in FIG. 3).

Specifically, the roll temperature calculation part 64 calculates the inner surface temperature θS of the roll main body 2 using the following expression.

$$\theta S = \left| \{(2 \times 5.03^2 \pi R_2 1_S + (\pi\Phi)^2 \mu s \times f\} - \right.$$
$$\left. \sqrt{[\{2 \times 5.03^2 \pi R_2 1_S + (\pi\Phi)^2 \mu s \times f\}^2 - 4 \times 5.03^4 (\pi R_2 1_S)^2]} \right| /$$
$$\{2 \times (5.03\pi)^2\} - 14.3 \left| / (2.86 \times 10^{-2}) [^\circ C] \right.$$

When doing this, the roll temperature calculation part 64 calculates $R_2$ in the above expression for the inner surface temperature $\theta_S$ using the following expressions.

$$r_2 = r_0(r_1 - r_{comb})/(r_{comb} - r_1 - r_0)$$

$$R_2 = (r_2/N^2) \times 10^6$$

Here, the combined resistance $r_{comb}$ is given by $r_{comb} = (V/I) \times \cos \varphi$, and therefore the inner surface temperature $\theta_S$ can be calculated from the AC voltage value obtained by the AC voltage detecting part 8, AC current value obtained by the AC current detecting part 7, the power factor obtained by the power factor detecting part 10, the winding resistance value obtained by the resistance detecting part or the winding resistance value obtained from the winding temperature obtained by the temperature detecting part 9, and the excitation resistance value obtained from the characteristics of the relationship between the magnetic flux density and the excitation resistance of the magnetic circuit.

Figure 7:
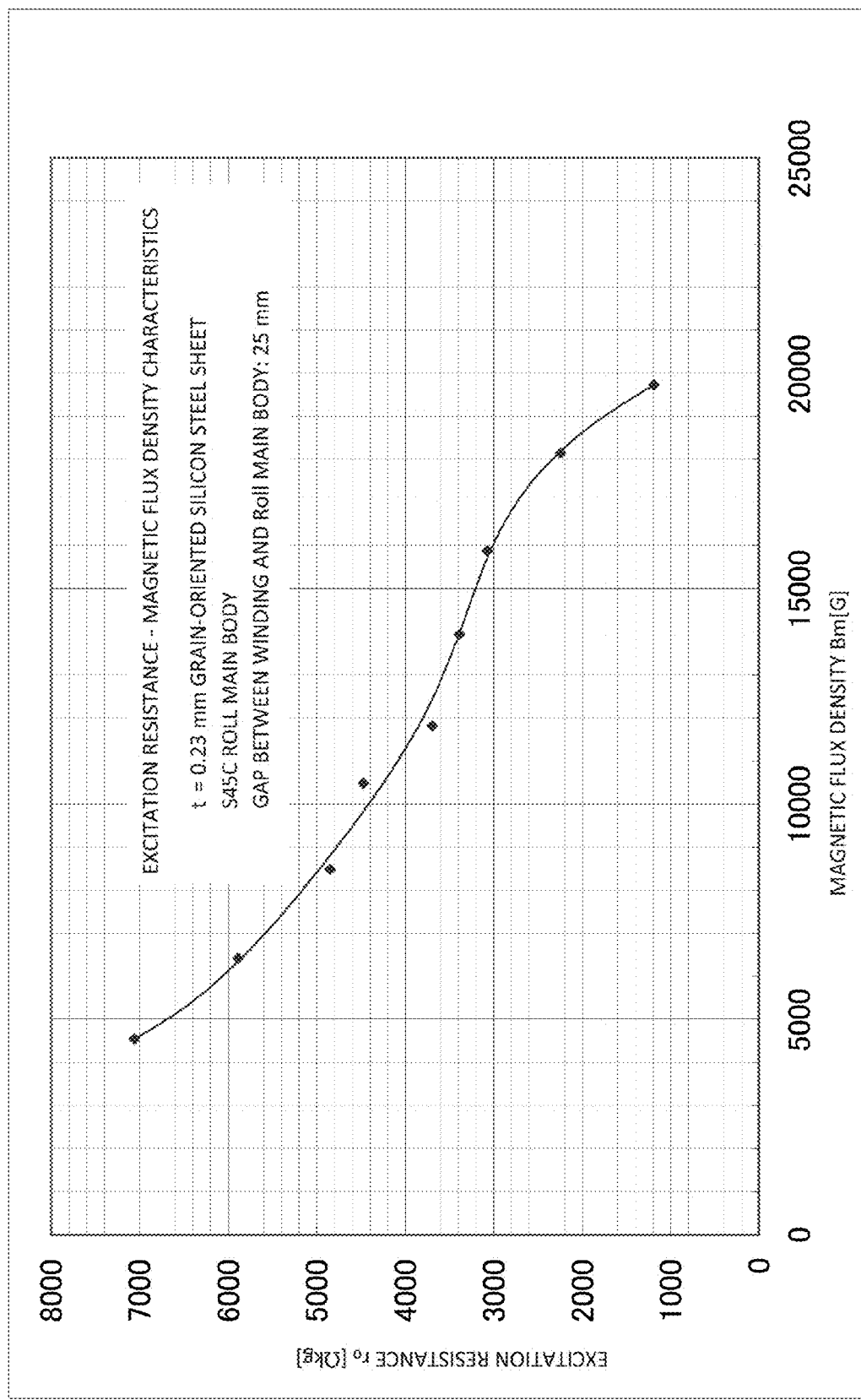
FIG. 7 is a characteristics graph illustrating a relationship between magnetic flux density and excitation resistance of a magnetic circuit configured to include a roll main body made of carbon steel (S45C) and an iron core formed from a grain-oriented silicon steel sheet.
Figure 8:
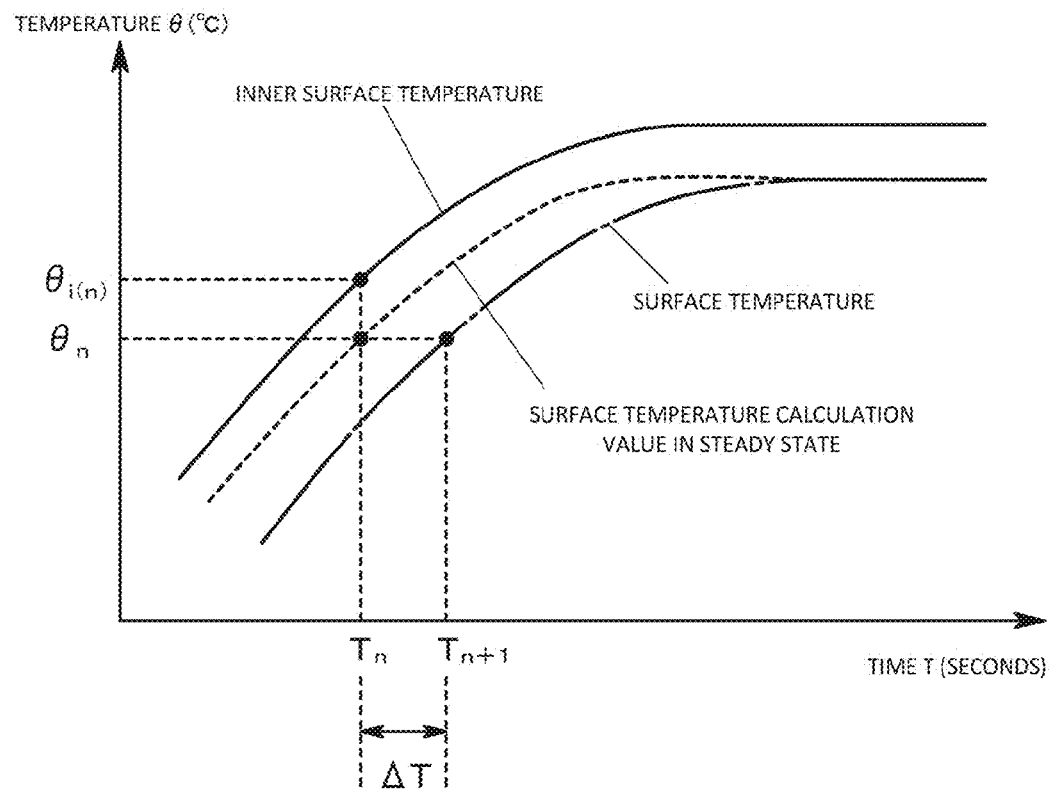
FIG. 8 is a diagram illustrating temperature change characteristics of the roll main body during a temperature rise transient period.
Figure 9:
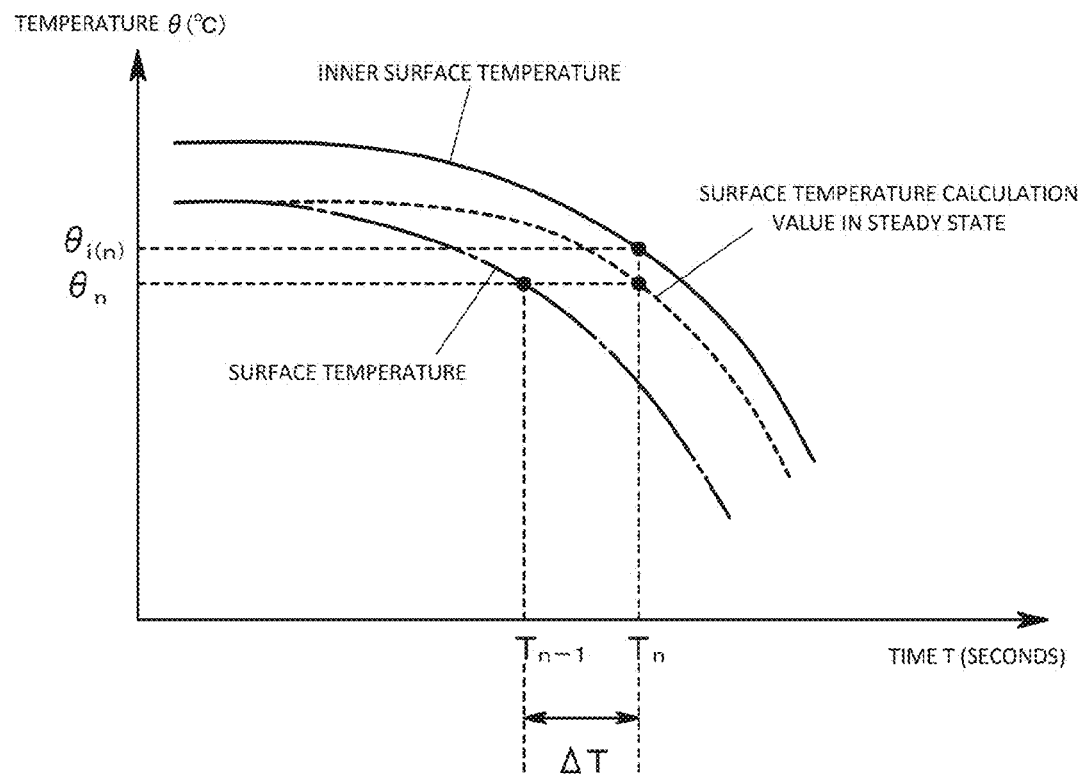
FIG. 9 is a diagram illustrating temperature change characteristics of the roll main body during a temperature fall transient period.

The excitation resistance $r_0$ can be obtained from the magnetic flux density-excitation resistance relationship data indicating the relationship between the magnetic flux density Bm and the excitation resistance $r_0$ of the magnetic circuit in the induction heated roll 200 illustrated in FIG. 7. Specifically, the magnetic density Bm of the roll main body 2 is calculated using the following expression, and from the obtained magnetic flux density Bm and the magnetic flux density-excitation resistance relationship data, the excitation resistance $r_0$ is obtained.

$$Bm = Vm \times 10^8/(4.44 \times f \times N \times Sm) [G]$$

Here, Vm is a voltage value [V] obtained by a vector calculation in which voltage drops caused by the reactance $l_1$ of the winding 32 and the resistance $r_1$ of the winding 32 are subtracted from the input AC voltage V. f is a frequency [Hz], N is the number of turns of the winding 32, and Sm is the magnetic path cross-sectional area [cm$^2$] of the iron core.

The resistance $r_1$ of the winding 32 is determined by the material, length, and cross-sectional area of a wire forming the winding 32, and the temperature of the winding, and, for example, in the case where the material of the wire is copper, can be calculated using the following expressions.

$$r_1 = kL/100Sc [\Omega]$$

$$k = 2.1(234.5 + \theta_c)/309.5$$

Here, L is the length [m] of the wire, Sc is the cross-sectional area [mm$^2$] of the wire, and $\theta_c$ is the winding temperature [° C.].

By obtaining the combined resistance $r_{comb}$, excitation resistance $r_0$, and winding resistance $r_1$ using the expressions described above, the resistance $r_2$ of the roll main body 2 can be calculated, and $R_2$, which is the secondary side conversion resistance as viewed from the roll main body side and has a unit of μΩ, can be further calculated.

Figure 5:
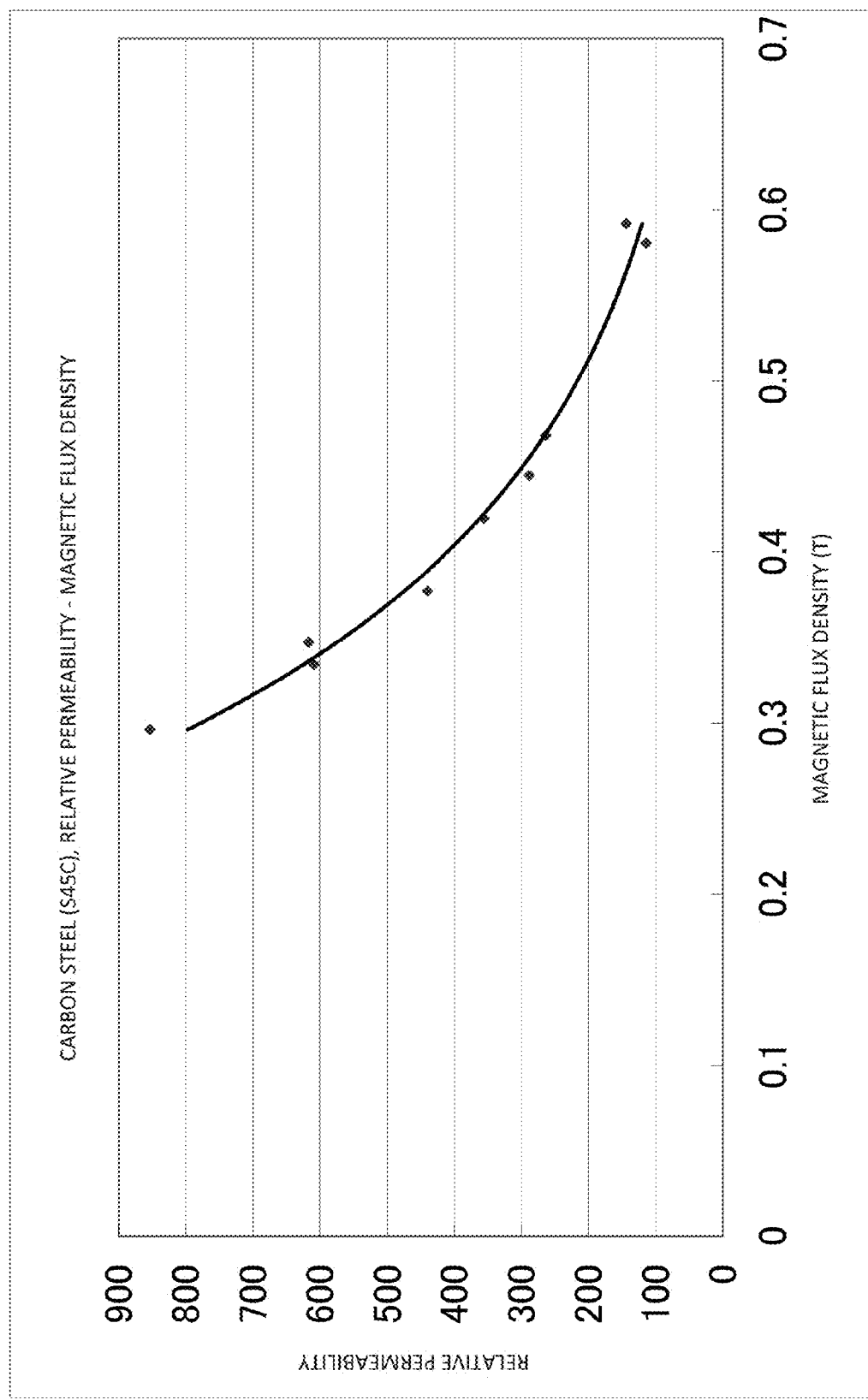
FIG. 5 is a characteristics graph illustrating a relationship between magnetic flux density and relative permeability of carbon steel (S45C)
Figure 6:
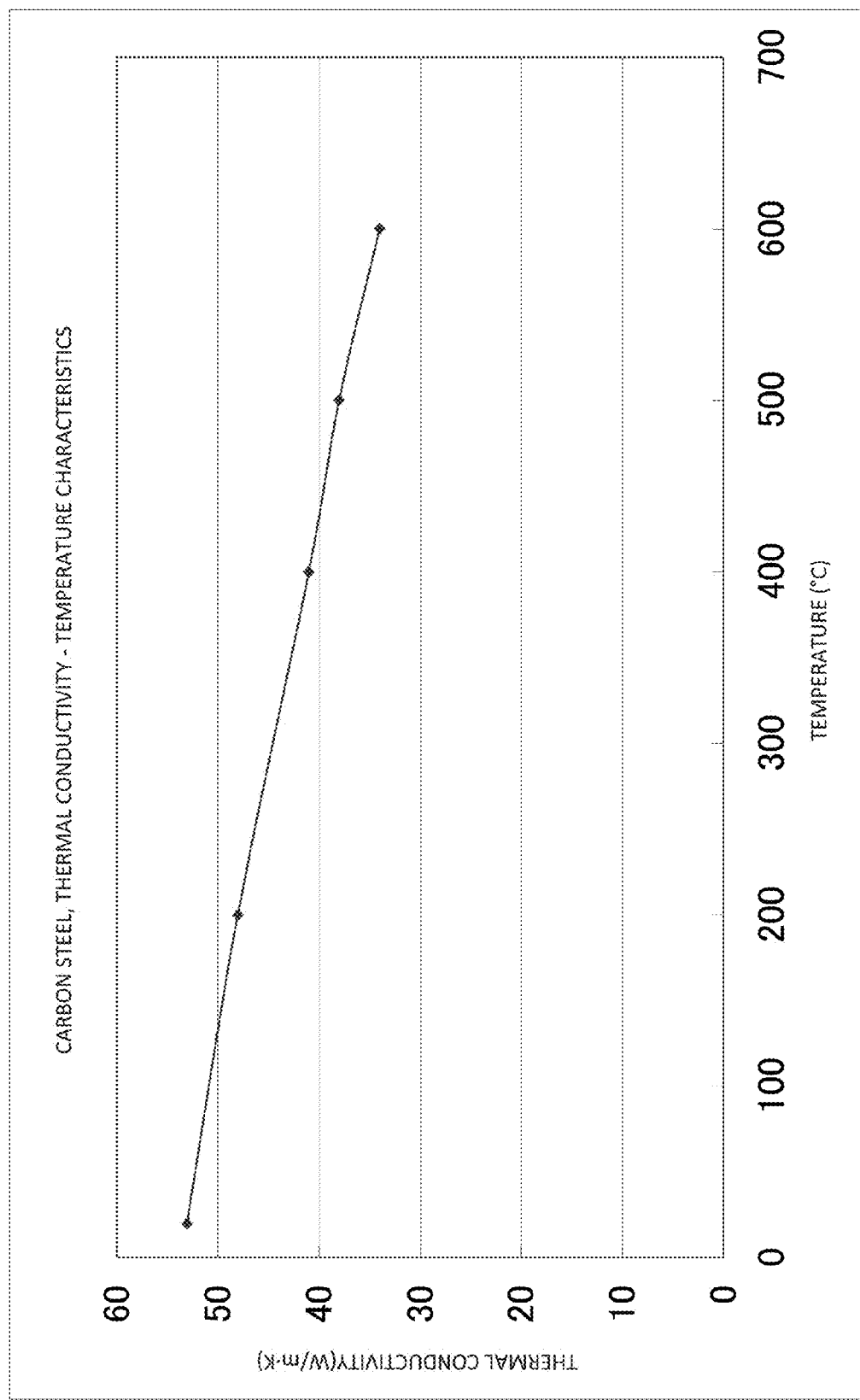
FIG. 6 is a characteristics graph illustrating a relationship between temperature and thermal conductivity of carbon steel (S45C)

Also, the roll temperature calculation part 64 obtains relative permeability μs from the relative permeability-magnetic flux density relationship data indicating the relationship between the relative permeability and the magnetic flux density illustrated in FIG. 5, and the magnetic flux density of the roll main body 2 (value determined by specifications).

Further, the roll temperature calculation part 64 substitutes the resistance $R_2$ of the roll main body 2 and the relative permeability μs obtained as described above into the expression above to calculate the inner surface temperature $\theta_S$ of the roll main body 2.

Specifically, given that the temperature difference between the inner surface temperature $\theta_S$ and surface temperature (outer surface temperature) of the roll main body 2 is θ [° C.], the roll temperature calculation part 64 corrects the inner surface temperature $\theta_S$ to calculate the surface temperature using the temperature difference θ obtained from the following expression ((5) in FIG. 3).

$$\theta = kP/[2\pi/\{\ln(d_2/d_1)/\lambda\}]$$

Here, $d_1$ is the inside diameter [m] of the roll main body 2, $d_2$ is the outside diameter [m] of the roll main body 2, λ is the thermal conductivity [W/m·° C.] of the roll main body 2 at average temperature, and P is a thermal flow rate [W/m], which has here a value obtained by dividing a calorific value [W] of the inner surface of the roll main body 2 by a calorific inner surface length [m] (equal to the winding width). Also, k is a correction factor calculated from actual measured values. In addition, to obtain the thermal flow rate [W/m], the roll temperature calculation part 64 uses an electric power value obtained by calculation from the respective measured values by the current detecting part 7, voltage detecting part 8, and power factor detecting part 10. That is, given that electric power of the induction heated roll is P, $P = I \times V \times \cos \varphi$, and a value obtained by subtracting coil electric power $P_C$ and iron loss $P_f$ from the roll electric power P is electric power $P_S$ of the roll main body.

Here, the coil electric power $P_C$ is given by $P_C = r_1 \times (kI)^2$ (k is an augmentation factor corresponding to eddy current generated in the wire, and has a value determined by the shapes of the winding and the wire. In the case of an examined roll, k=1.2), and the iron loss $P_f$ is given by $P_f = \{(Vm/r_0)^2\} \times r_0/2 = Vm^2/(2 \times r_0)$. In the calculation of the iron loss $P_f$, the square of the excitation current is multiplied by the excitation resistance, which is then multiplied by ½ because the calculation is performed considering iron loss in the iron core of the magnetic flux generating mechanism and iron loss in the roll main body fifty-fifty.

That is, the electric power $P_S$ of the roll main body is given by the following expression.

$$P_S = P - P_C - P_f = I \times V \times \cos \varphi - r_1 \times (kI)^2 - Vm^2/(2 \times r_0)$$

In addition, the roll temperature calculation part 64 calculates the outer surface temperature of the roll main body 2 in consideration of a reduction in thickness due to the jacket chambers 2S formed in the roll main body 2.

Specifically, on the assumption that the inside diameter $d_1$ of the roll main body 2 is substituted by a virtual inside diameter $d_{j1}$ $(=d_1 + t\{1 - \alpha(1 - S_j/S)\})$ taking into account the reduction in thickness, and the outside diameter $d_2$ of the roll main body 2 is substituted by a virtual outside diameter $d_{j2}$ $(=d_2 - t\{1 - \alpha(1 - S_j/S)\})$ taking into account the reduction in thickness, where S is the cross-sectional area of the roll main body 2, $S_j$ is the sum of cross-sectional areas of the jacket chambers 2S, and t is the thickness of the roll main body 2, the roll temperature calculation part 6 calculates the outer surface temperature of the roll main body 2 using the temperature difference θ obtained from the above expression for the temperature difference θ.

On the basis of the outer surface temperature of the roll main body 2 obtained by the roll temperature calculation part 64 in the above manner, the roll temperature control part 65 controls the control element 4 of the power supply circuit so as to make the outer surface temperature of the roll main body 2 equal to a predetermined setting temperature.

The induction heated roll apparatus 100 of the present embodiment configured as described has the roll temperature calculation part 64 that calculates the temperature of the roll main body 2 using the value of the AC current flowing through the winding 32, the value of the AC voltage applied to the winding 32, the power factor of the induction heated roll 200, the winding resistance value of the winding 32, and the excitation resistance value of the magnetic circuit configured to include the iron core 31 and the roll main body 2 as parameters, and can therefore calculate the temperature of the roll main body 2 without providing the roll main body 2 with a temperature detecting element.

Also, since the impedance obtained by the impedance calculation part 61 is corrected by the impedance correction part 62 using the conduction angle of the thyristor 4, the temperature of the roll main body 2 can be accurately calculated.

Further, since the roll temperature calculation part 64 calculates the surface temperature using the temperature difference θ between the inner surface temperature and the surface temperature of the roll main body 2, the surface temperature of the roll main body 2 can be accurately calculated. Also, a time lag in reaching temperature during a transient period such as a temperature rise or fall period is also calculated and corrected by the roll temperature calculation part 64, and therefore the surface temperature of the roll main body 2 can be accurately calculated.

Note that the present invention is not limited to the above-described embodiment.

For example, the induction heated roll of the above-described embodiment may be a so-called double-sided support induction heated roll in which both end parts of a roll main body in an axial direction are rotatably supported, or a so-called single-sided support induction heated roll in which the bottom part of a bottom-equipped tubular roll main body is connected with a rotary shaft and rotatably supported.

Further, the above-described embodiment is configured such that the temperature detecting part 9 adapted to detect the temperature of the winding 32 is embedded in the winding 32; however, the present invention may be configured as follows.

Figure 10:
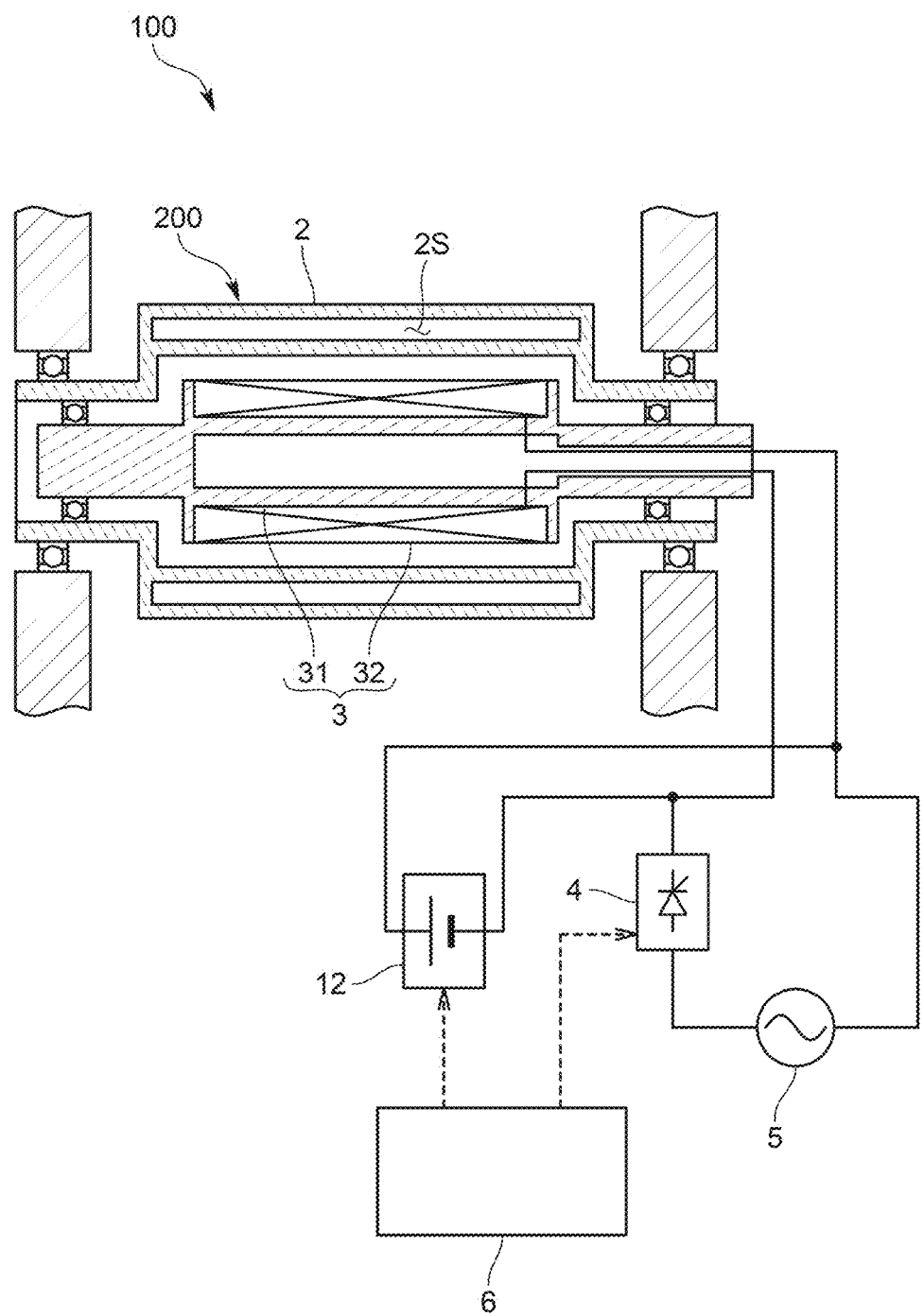
FIG. 10 is a diagram schematically illustrating a configuration of an induction heated roll apparatus according to a variation.
Figure 11:
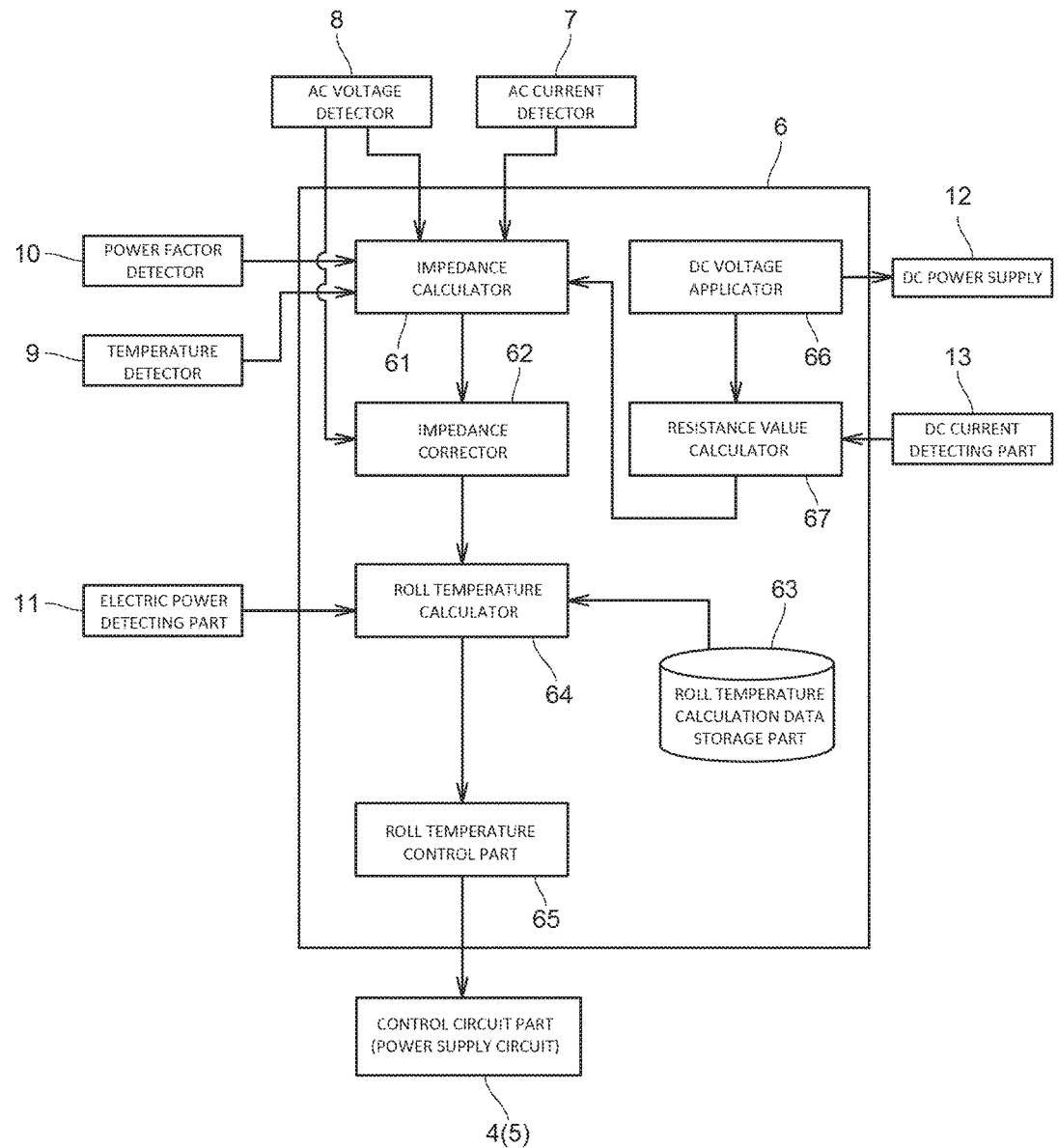
FIG. 11 is a functional configuration diagram of a control device in the same variation.

That is, as illustrated in FIGS. 10 and 11, the control device 6 may be configured to perform a temperature detecting operation that periodically detects the temperature of the winding 32 during heating operation for inductively heating the roll main body 2 to treat a heated object. More specifically, the control device 6 fulfills functions as a DC voltage application part 66 and a resistance value calculation part 67.

The DC voltage application part 66 is one that controls a DC power supply 12 electrically connected to the winding 32 to intermittently apply DC voltage to the winding 32. Specifically, the DC voltage application part 66 is one that applies a constant DC voltage to the winding 32 for an application time of several seconds or less with a regular period of several seconds to several tens of minutes.

Note that within the application time for which the DC voltage application part 66 applies the DC voltage to the winding 32, the roll temperature control part 65 of the control device 6 controls the control element 4 to interrupt or minimize the AC current or the AC voltage. In other words, the roll temperature control part 65 is one that, in order to make the temperature of the roll main body 2 equal to a predetermined setting temperature, controls the control element 4 provided for the power supply circuit 5 to control the AC voltage or the AC current.

The resistance value calculation part 67 is one that calculates the winding resistance value of the winding 32 from the DC voltage applied by the DC voltage application part 66 and DC current flowing through the winding when applying the DC voltage to the winding 32. Specifically, the resistance value calculation part 67 calculates the winding resistance value of the winding 32 from the DC voltage preliminarily inputted from the DC power supply 12 and the DC current obtained by a DC current detecting part 13 provided in a DC circuit configured to include the winding 32 and the DC power supply 12.

As described above, since at the time of applying the DC voltage to detect the DC current, the AC current or the AC voltage is interrupted or minimized, the effect of the AC current (AC component) can be suppressed to easily detect the DC current (DC component), and therefore the resistance value can be accurately calculated.

Needless to say, the present invention is not limited to any of the above-described embodiments, but can be variously modified without departing from the scope thereof. Also, needless to say, in the case where an error occurs between an actual measured value and a calculated value in each calculation step, a correction factor calculated from actual measured values is used to make a correction.

REFERENCE CHARACTER LIST

100: Induction heated roll apparatus
200: Induction heated roll
2: Roll main body
2S: Jacket chamber
3: Magnetic flux generating mechanism
32: Winding
4: Control element
5: Power supply circuit
6: Control device
61: Impedance calculation part
62: Impedance correction part
63: Roll temperature calculation data storage part
64: Roll temperature calculation part
7: Current detecting part
8: Voltage detecting part
9: Temperature detecting part
10: Power factor detecting part

The invention claimed is:

1. An induction heated roll apparatus comprising: a roll main body that is rotatably supported; a magnetic flux generating mechanism that is provided inside the roll main body and includes an iron core and a winding wound around the iron core; and a power supply circuit that is connected to the winding and provided with a controller that controls AC current or AC voltage, the induction heated roll apparatus lacking a temperature detecting element for measuring a temperature of the roll main body, and the induction heated roll apparatus further comprising:

a roll temperature calculation data storage that stores magnetic flux density-excitation resistance relationship data indicating a relationship between magnetic flux density generated by the magnetic flux generating mechanism and an excitation resistance of a magnetic circuit configured to include the iron core and the roll main body;

a processor; and a memory storing instructions that, when executed by the processor, cause the processor to execute a roll temperature calculator that calculates the temperature of the roll main body with use of, as parameters, an AC current value obtained by an AC current detector that detects the AC current flowing through the winding, an AC voltage value obtained by an AC voltage detector that detects AC voltage applied to the winding, a power factor obtained by a power factor detector that detects the power factor of an induction heated roll including the roll main body and the magnetic flux generating mechanism, a winding resistance value of the winding, and an excitation resistance value obtained from the magnetic flux density-excitation resistance relationship data and a characteristic of the relationship between magnetic flux density generated by the magnetic flux generating mechanism and the excitation resistance of the magnetic circuit configured to include the iron core and the roll main body.

2. The induction heated roll apparatus according to claim 1, wherein the roll temperature calculator calculates the temperature of the roll main body by using a resistance value of the roll main body and a relative permeability of the roll main body, wherein the resistance value of the roll main body is calculated using, as parameters, the AC current value obtained by the AC current detector, the AC voltage value obtained by the AC voltage detector, the power factor obtained by the power factor detector, the winding resistance value, and the excitation resistance value obtained from the characteristic of the relationship between the magnetic flux density and the excitation resistance of the magnetic circuit.

3. The induction heated roll apparatus according to claim 1, comprising:

a winding temperature detector that detects a temperature of the winding; and a resistance value calculator, included in the memory and executable by the processor, that calculates the winding resistance value from the temperature of the winding, the temperature being obtained by the winding temperature detector, wherein the roll temperature calculator calculates the temperature of the roll main body with use of the winding resistance value obtained by the resistance value calculator.

4. The induction heated roll apparatus according to claim 1, comprising:

a DC voltage applicator that controls a DC power supply to intermittently apply DC voltage to the winding; and a resistance value calculator, included in the memory and executable by the processor, that calculates the winding resistance value from the DC voltage applied by the DC voltage applicator and DC current flowing through the winding when applying the DC voltage, wherein the roll temperature calculator calculates the temperature of the roll main body with use of the winding resistance value obtained by the resistance value calculator.

5. The induction heated roll apparatus according to claim 1, wherein given that a temperature difference between an inner surface temperature and a surface temperature of the roll main body is θ [° C.], the roll temperature calculator corrects the temperature of the roll main body with use of the temperature difference θ obtained from $$\theta = kP/[2\pi/\{\ln(d_2/d_1)/\lambda\}]$$

(where $d_1$ is an inside diameter [m] of the roll main body, $d_2$ is an outside diameter [m] of the roll main body, λ is a thermal conductivity [W/m·° C.] of the roll main body at average temperature, P is a thermal flow rate [W/m], and k is a correction factor).

6. The induction heated roll apparatus according to claim 5, wherein inside a lateral circumferential wall of the roll main body, jacket chambers in which a gas-liquid two-phase heating medium is included are formed, and given that a cross-sectional area of the roll main body is S, a sum of cross-sectional areas of the jacket chambers is $S_j$, a thickness of the roll main body is t, and a variable indicating a ratio of a reduction of a function of the jacket chambers is α, wherein the reduction is caused by a reduction in pressure of the heating medium along with a reduction in temperature, the roll temperature calculator corrects the temperature of the roll main body with use of the temperature difference θ obtained on an assumption that the inside diameter $d_1$ of the roll main body is substituted by $d_{j1} = d_1 + t\{1 - \alpha(1 - S_j/S)\}$, and the outside diameter $d_2$ of the roll main body is substituted by $d_{j2} = d_2 - t\{1 - \alpha(1 - S_j/S)\}$.

7. The induction heated roll apparatus according to claim 1, wherein the controller uses a semiconductor to control a conduction angle of current or voltage, the induction heated roll apparatus further comprising:

an impedance calculator that calculates an impedance with use of: the AC current value obtained by the AC current detector, the AC voltage value obtained by the AC voltage detector, and the power factor obtained by the power factor detector; and an impedance corrector that, with use of the conduction angle controlled by the controller, corrects the impedance obtained by the impedance calculator, wherein the roll temperature calculator calculates the temperature of the roll main body with use of corrected impedance resulting from the correction by the impedance corrector.

8. The induction heated roll apparatus according to claim 1, wherein the roll temperature calculator calculates an inner surface temperature of the roll main body, in addition to calculating a surface temperature calculation value of the roll main body in a steady state from the inner surface temperature, and calculates a surface temperature of the roll main body during a transient period, on a premise that the surface temperature of the roll main body reaches the surface temperature calculation value after a time period ΔT given by $\Delta T = k \times w \times c \times c/(2\lambda)$ [h] (where w is a specific gravity [kg/m$^3$] of a material of the roll main body, c is a specific heat [kcal/kg·° C.] of the material of the roll main body, t is a thickness [m] of the roll main body, λ is a thermal conductivity [kcal/m·h·° C.] of the material of the roll main body, and k is a correction factor obtained from a measured value).

* * * * *